Figure 1:
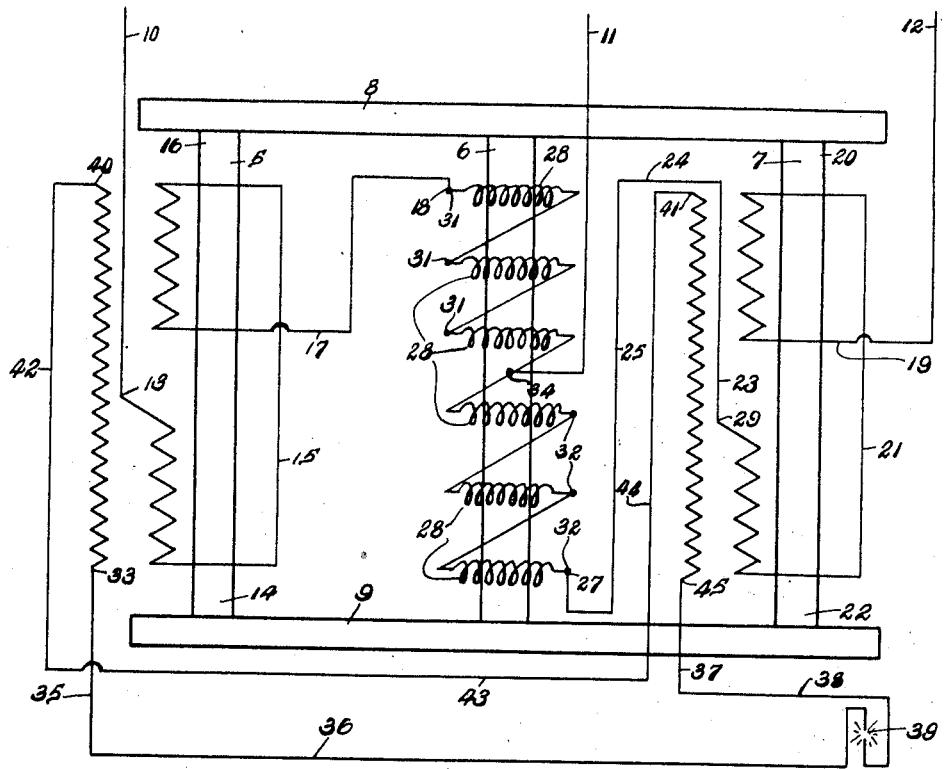

Aug. 30, 1932.       H. GRONAU       1,874,508
ALTERNATING CURRENT WELDER
Filed May 27, 1931

Inventor
Herman Gronau
By Murray and Zugelter
Attorneys

Patented Aug. 30, 1932

1,874,508

UNITED STATES PATENT OFFICE

HERMAN GRONAU, OF CINCINNATI, OHIO

ALTERNATING CURRENT WELDER

Application filed May 27, 1931. Serial No. 540,292.

This invention relates to an electric welding device and particularly to a novel form of electrical circuit utilizing alternating current.

An object of the invention is to provide such a device in which the operating circuit is of such character as to make possible a material reduction in the size of the welder.

Another object is to provide such a welder in which transformation of the voltage and cycles at the welding point is effected.

Another object is to provide a device of the class described in which the advantages of a direct current welder are attained and in which the disadvantages of the usual alternating current arc and welding device are obviated.

These and other objects are attained by the means described herein and illustrated in the accompanying drawing, in which:

Fig. 1 is a diagrammatic view of the device and of the electrical circuit employed therewith according to the present invention.

The welding device may comprise three metal cores 5, 6, and 7 supported between suitable mounting members 8 and 9. Cores 5 and 7 are wrapped identically with electrical conducting wire and constitute a pair of transformers while core 6 is provided with a connected series of coils each having a separate tap. The coils of said series are connected selectively, one each, to one of the transformer circuits, said series being interposed thus between the transformer circuits.

The circuit illustrated herein is of the three phase type and comprises the source or power lines 10, 11 and 12. The continuation of line 10 constitutes the primary winding on core 5. This winding begins at substantially the mid-point 13 of core 5, continues in the direction of one end 14 of the core and is then carried, as indicated by line 15, toward the opposite end 16 of the core. From this point the winding is continued in the direction of the mid-point of core 5, and is given the same number of turns as that at the opposite end of the core. The winding thereafter, adjacent the midpoint of core 5, is carried outwardly as at 17 and its end 18 is adapted to be placed in electrical contact with any one of the taps 31 of an interposed inter-connected series 28 of coils, commonly known as percentage winding and wrapped about the core 6.

The primary winding on core 7 is a continuation of the power or source line 12. The winding begins at an intermediate point, as at 19, continues toward an end 20 of core 5, is carried, as at 21, toward the opposite end 22 of the core and is wrapped about core 7 up to an intermediate point 29 and traverses a path indicated by lines 23, 24 and 25, to selective connection as at 27, with one of the taps 32 of the interposed series 28. It should be noted that the winding sections on both cores 5 and 7 are of the same number of turns and are in the same direction.

The source line 11 has its end permanently connected as at 34 at the mid-point of the percentage winding or coils 28, on core 6. This line serves as the common outlet for the two transformer circuits heretofore described.

Secondary winding is provided on cores 5 and 7 being preferably wrapped 100 turns in each instance. The secondary winding encloses both sections of primary winding on each core. At similar points 33 and 45 the two secondary windings are continued outwardly along the lines 35, 36, and 37, 38, respectively, and terminate at the welding arc 39. The opposite ends 40 and 41 of the two secondary windings are joined or "strapped" as indicated by the lines 42, 43, 44. The selective changing of the termini of the primary windings of the transformers from one to another of the taps 31 and 32 varies the resultant arc at the welding point in accordance with the current flow conditioned by such changes, and in accordance with the requirements of various types of welding work to be done.

The structure disclosed, while utilizing alternating current, attains the major desirable features incident to the use of direct current welding devices and the major objectionable features incident to the use of alternating current, are eliminated.

What is claimed is:

1. A welding device adapted for use with alternating electrical current and comprising a pair of connected transformers having a series of resistance coils disposed between the primary circuits thereof, the terminus of each of said primary circuits being adapted for selective connection with one of a group of said resistance coils, a current conducting line permanently connected at the mid-point of said series of coils and forming a common conductor for the two transformer circuits, and welding means interposed in the secondary circuit of the transformers, said transformer circuits and the associated means being adapted to reduce the current used from a higher voltage at the source to a lower voltage at the welding point, and to increase the amperage at the source to a higher degree at the welding point.

2. A welding device utilizing a three-phase electrical circuit with alternating current, and comprising two transformers each provided with primary winding connected at one end with the electrical current source, said winding in each transformer, being wrapped a selected number of turns upon its transformer core from an intermediate point thereon toward an end of said core, carried to the opposite end of the core, wrapped at said opposite end, in the same selected number of turns, toward the intermediate portion of the core, and thereafter carried outwardly, said primary windings being wrapped unidirectionally, a connected series of resistance coils, provided with individual taps, the outwardly-carried end of each of said primary transformer windings being adapted for selective connection with one of the taps of a group of said coils for varying the current of the primary transformer circuits, an electrical conducting line permanently connected at the mid-point of said series of resistance coils and constituting a common line of the two transformer circuits, and secondary windings of an equal number of turns, covering the primary windings, and having like ends thereof electrically connected and the other ends thereof connected one each to one of the electrodes of a welding device.

3. In an alternating current welding device, the combination with a three phase alternating current power source, of a primary system comprising two cores, a plurality of unidirectional primary windings connected in series on each of the cores, two of the power source lines each having a connection with one of the coils on one of the cores, a third core, the third core having its ends connected to and between the polar ends of the two first mentioned cores, control coils on the third core, said control coils being connected in series to one another, the third power source line being permanently connected at the mid-point of said series of control coils and constituting a common conducting line of said two first-mentioned power source lines, and means for selectively connecting the termini of said two lines with the control coils for making variable connection to the third power source line, and a secondary winding for each of the two first mentioned cores, said secondary windings being unidirectional and connected in series, and means included in the secondary circuit for providing a welding arc.

4. In an electrical welding device the combination of a secondary circuit comprising a pair of spaced unidirectional windings connected in series, and including a welding arc, a pair of cores and about each of which cores one of the secondary windings is disposed, a third core having its ends connected to and between the magnetic poles of the first mentioned pair of cores, a plurality of primary unidirectional windings on each of the first mentioned cores, a plurality of control coils connected in series and disposed upon said third core, and means for interposing a selected number of said coils into the circuits of said primary windings for varying the secondary circuit.

In testimony whereof, I have hereunto subscribed my name this 22nd day of May, 1931.

HERMAN GRONAU.